United States Patent [19]

Murai et al.

[11] Patent Number: 4,858,157
[45] Date of Patent: Aug. 15, 1989

[54] APPARATUS AND METHOD FOR DETERMINING THE COORDINATES OF A THREE-DIMENSIONAL OBJECT

[75] Inventors: Shunji Murai, Hachiouji; Fumio Ohtomo, Kawagoe; Hitoshi Ohtani, Tokyo, all of Japan

[73] Assignee: Tokyo Kogaku Kikai Kabushiki Kaisha, Tokyo, Japan

[21] Appl. No.: 838,577

[22] Filed: Mar. 11, 1986

[30] Foreign Application Priority Data

Mar. 13, 1985 [JP] Japan .................................. 60-49907
Mar. 13, 1985 [JP] Japan .................................. 60-49908

[51] Int. Cl.$^4$ ........................ G01B 9/00; G01B 11/24; G06K 9/00; G01C 11/12
[52] U.S. Cl. ..................................... 364/560; 364/525; 382/1; 356/2; 356/376; 358/88
[58] Field of Search ............... 364/560, 561, 562, 563, 364/525; 382/1, 8, 30; 356/1, 2, 4, 376, 390; 358/88, 91, 92

[56] References Cited

U.S. PATENT DOCUMENTS

| | | | |
|---|---|---|---|
| 3,726,591 | 4/1973 | Helava et al. | 356/2 |
| 3,943,344 | 3/1976 | Kidode et al. | 364/562 |
| 4,200,861 | 4/1980 | Hubach et al. | 382/30 |
| 4,313,678 | 2/1982 | Colvocoresses | 356/2 |
| 4,343,553 | 8/1982 | Nakagawa et al. | 356/376 |
| 4,573,191 | 2/1986 | Kidode | 382/1 |
| 4,583,117 | 4/1986 | Lipton et al. | 358/92 |
| 4,601,653 | 7/1986 | Grumet | 382/1 |
| 4,630,203 | 12/1986 | Szirtes | 356/2 |
| 4,644,582 | 2/1987 | Morishita et al. | 382/6 |
| 4,654,872 | 3/1987 | Hisano et al. | 382/1 |
| 4,700,398 | 10/1987 | Mizuno et al. | 382/1 |
| 4,724,526 | 2/1988 | Cole et al. | 364/562 |
| 4,731,650 | 3/1988 | Hadfield et al. | 364/560 X |
| 4,755,047 | 7/1988 | Kato et al. | 356/2 X |

*Primary Examiner*—Parshotam S. Lall
*Assistant Examiner*—Joseph L. Dixon
*Attorney, Agent, or Firm*—Brumbaugh, Graves, Donohue & Raymond

[57] ABSTRACT

A coordinates measuring apparatus comprising a detecting unit constituted by an optical system for obtaining an image of an object and a detecting system having a plurality of arrayed detecting elements disposed in such a manner that respective detecting signals are superposed at the position of said image, a control unit for taking out data from each of said arrayed detecting elements, and a storage unit for storing the data of each array taken out from said control unit.

7 Claims, 7 Drawing Sheets

CLOCK SIGNAL T1(S) ⨅⨅⨅⨅⨅---⨅⨅⨅⨅⨅-----⨅⨅⨅⨅-----⨅⨅⨅⨅⨅----⨅⨅⨅⨅⨅

TIMING PULSE
SIGNAL T2(S) ⨅_____⨅_____⨅_____⨅_____⨅

READ START
SIGNAL S(S) _____⨅_____

WRITE SIGNAL T3(S) _____⨅⨅⨅_⨅⨅⨅___

READ COMPLETION
SIGNAL E(S) _____⌐‾‾

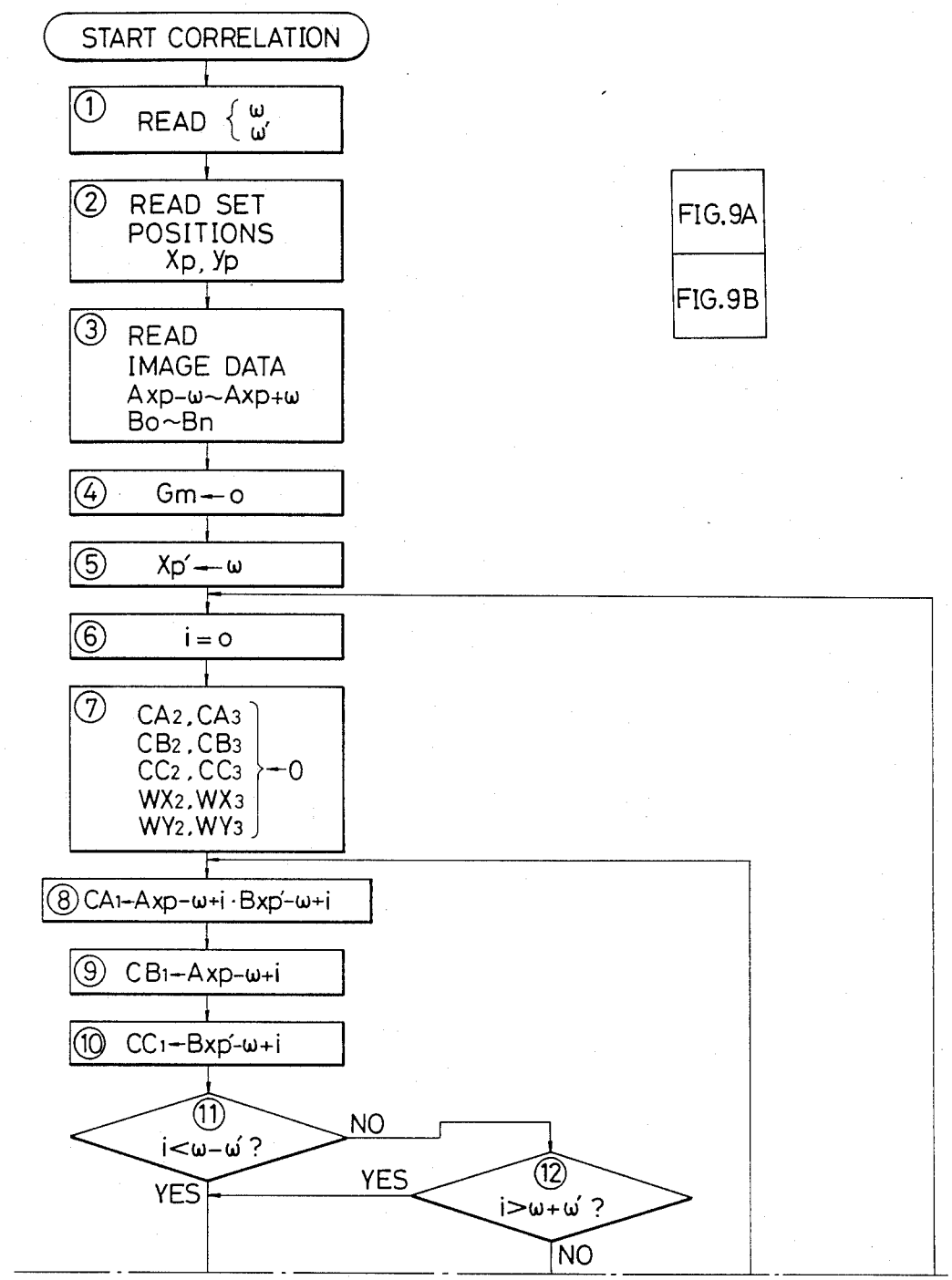

APPARATUS AND METHOD FOR DETERMINING THE COORDINATES OF A THREE-DIMENSIONAL OBJECT

BACKGROUND OF THE INVENTION

1. Field of the Invention

The present invention relates to a method of and apparatus for measuring coordinates, and more particularly to a method of and apparatus for measuring three-dimensional coordinates at a measurement point on an object or three-dimensional coordinates at an arbitrarily selected measurement point in a stereo image.

2. Description of Prior Art

As an example of a conventional method of noncontact-type measurement of three-dimensional coordinates, a method is known whereby corresponding measurement points are extracted from a pair of stereo pictures, and three-dimensional coordinate values are calculated from the coordinates at these measurement points.

In the above-described conventional method of measurement of three-dimensional coordinates, technical skills and considerable time are involved in the extraction of a measurement point, and, particularly when the configuration of an object to be measured is complicated and has numerous points to be measured, the measurer suffers from considerable fatigue, and the work proceeds very inefficiently.

DESCRIPTION OF THE INVENTION

Object of the Invention

It is an object of the present invention to provide a method of and apparatus for measuring coordinates which is capable of easily effecting measurement by inputting the designation of a point to be measured only to one stereo image data, while a corresponding point in the other stereo image data is automatically determined by correlation processing without requiring any expert skills, thereby overcoming the above-described problems of the prior art.

Another object of the present invention is to provide a method of and apparatus for measuring coordinates in which, if the extraction of a corresponding point with respect to a point being measured has not been carried out accurately, the point being measured is viewed as floating or submerging relative to an object being measured, thereby making it possible to easily check whether or not the extraction of an erroneous corresponding point (hereinafter referred to as "mismatching") has taken place.

Still another object of the present invention is to provide a method of and apparatus for measuring coordinates which is capable of extracting corresponding points accurately with fewer mismatches irrespective of the situation of image data by providing a window having a different width to a first image data and performing correlation processing of a second image data on the basis of the same.

SUMMARY OF THE INVENTION

According to the present invention, the above and other objects can be accomplished by a coordinates measuring apparatus comprising: a storage unit for storing a first image data and a second image data together constituting a stereo image; a setting unit for setting a measurement point with respect to the first image data; a correlating unit for determining a corresponding point in the second image data with respect to the measurement point by means of correlation processing; a marker unit for adding a measurement point mark data to the first image data on the basis of data concerning the measurement point supplied from the setting unit and for adding a corresponding point mark data to the second image data on the basis of the data of the corresponding point supplied from the correlating unit so as to output the added data; an image forming unit for forming an image on the basis of the first image to which the measurement point mark is added upon receipt of the output of the marker unit and the second image to which the corresponding mark is similarly added; and a display unit for finding and displaying three-dimensional data both from the data of the measurement point and the data of the corresponding point found from the correlating unit.

In addition, the present invention also provides a method of measuring coordinates, comprising: a first step of storing a first image data and a second image data for constituting a stereo image; a second step of setting a measurement point in the first image data; a third step of finding a corresponding point in the second image data corresponding to the measurement point by means of correlation processing; a fourth step of providing a measurement point mark to the first image data on the basis of said measurement point and providing a corresponding point mark to the second image data on the basis of the corresponding point; a fifth step of forming an image on the basis of the first image data provided with the measurement point mark and the second image data provided with the corresponding point mark; and a sixth step of calculating three-dimensional data of the measurement point on the basis of the measurement point data and the corresponding point data.

According to another aspect of the present invention, the above and other objects can also be accomplished by a coordinates measuring apparatus comprising: a detecting unit constituted by an optical system for obtaining an image of an object and a detecting system having a plurality of arrayed detecting elements disposed in such a manner that respective detecting signals are superposed at the position of said image; a control unit for taking out data from each of said arrayed detecting elements; and a storage unit for storing the data of each array taken out from said control unit.

The above and other objects and features of the present invention will become apparent from the following descriptions of preferred embodiments with reference to the accompanying drawings.

BRIEF DESCRIPTION OF THE DRAWINGS

FIGS. 9, 9A and 9B are a flowchart of an arithmetic unit for performing correlation processing.

DESCRIPTION OF THE PREFERRED EMBODIMENT

Description of an embodiment of the present invention will be made hereinafter separately for a data reading system and a processing output system.

Data Reading System

Figure 1:
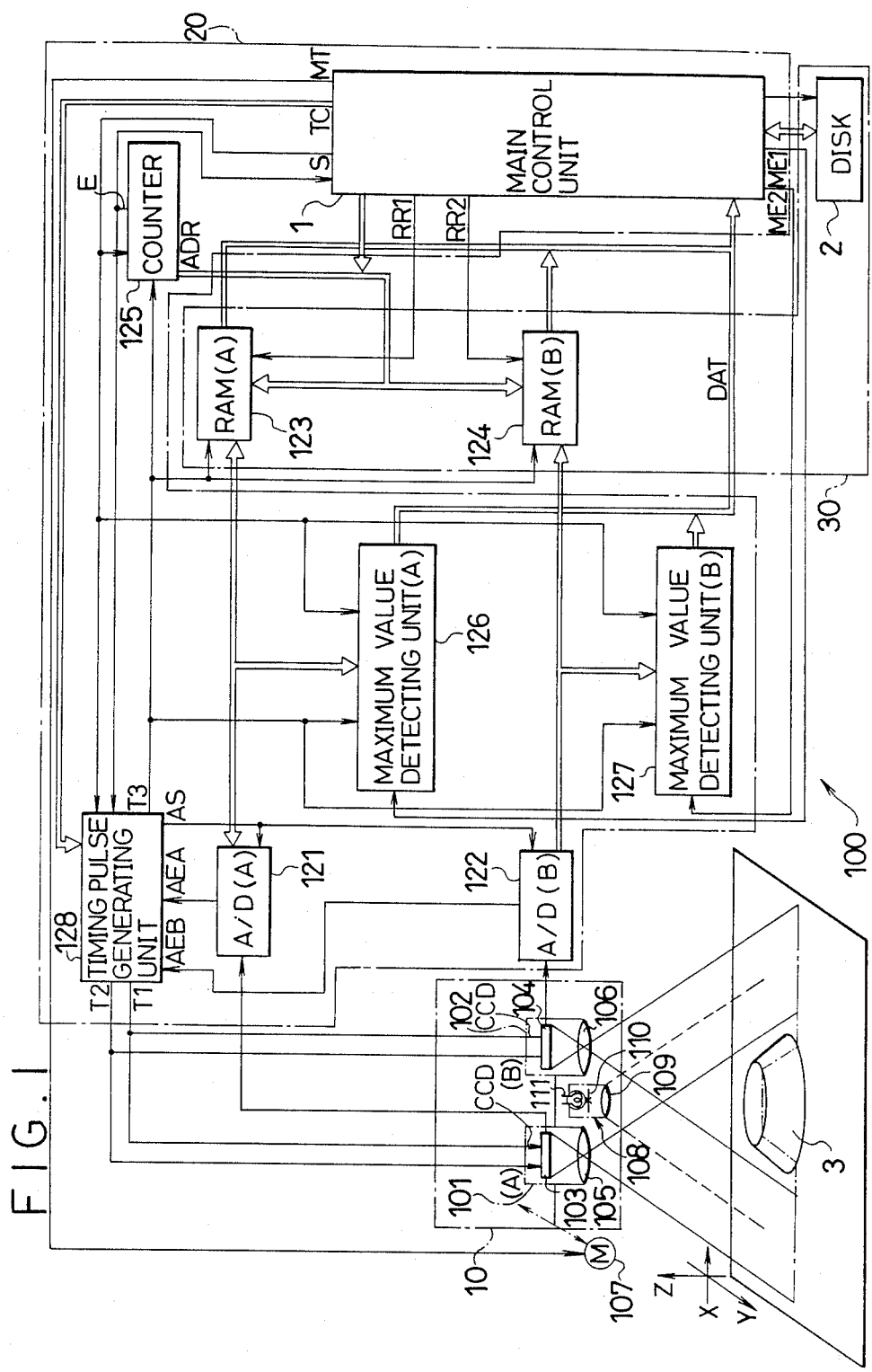
FIG. 1 is a block diagram of the data reading system of a coordinate measuring apparatus according to an embodiment of the present invention.

As shown in FIG. 1, a data reading system 100 comprises: a detecting unit 10 constituted by an optical system for obtaining an optical image of an object 3 to be measured and a means of photoelectrically detecting the optical image; a control unit 20 for receiving data from the detecting unit 10 and processing the same; and a storage unit 30 for storing the data obtained from the control unit 20.

First, as shown in FIG. 1, coordinates (X, Y, Z) are determined by taking the object 3 into consideration. The detector 10 is arranged such that two object lenses 105, 106 are disposed at positions above the object 3 such as to be aligned in the x-axis direction. Linear CCDs (charge coupled devices) 103, 104 are disposed at positions where the image of the object 3 are formed by means of the object lenses 105, 106, in such a manner that the detecting direction becomes parallel with the x-axis direction. The CCDs 103, 104 and the object lenses 105, 106 constitute a detecting unit (A) 101 and a detecting unit (B) 102, respectively, and are movable in the y-axis direction integrally with the detectors 101, 102 by means of a pulse motor 107.

An illumination unit 108 constituted by an object lens 109, a pattern film 110, and a light source 111 is interposed between the detectors 101, 102. The illumination unit 108 is used to project a latticed or striped pattern or a random pattern relating to the density or a period onto the surface of the object 3 when the surface of the object 3 does not have any pattern.

The control unit 20 and the storage unit 30 are arranged as follows. The control unit 20 includes an A/D converter (A) 121 and an A/D converter (B) 122 for converting signals from the detecting unit (A) 101 and the detecting unit (B) 102 to digital signals; a counter 125 for administering the addresses of RAMs 123, 124, which will be described later, when the RAMs 123, 124 store digital signals of one scanning cycle; a maximum value detecting unit (A) 127 and a maximum value detecting unit (B) 126 for detecting a maximum signal in one scanning cycle; and a timing pulse generating unit 128 for controlling the CCDs 103, 104 and timing of various units.

The storage unit 30 is constituted by the RAM (A) 123 and the RAM (B) 124 for storing digital signals in one scanning cycle and a disk 2 for storing the data of the entire scanning.

The timing pulse generating unit 128 outputs pulse signals for an A/D conversion start to the A/D converters 121, 122 via a signal line AS and receives A/D conversion completion signals from the A/D converters 121, 122 via signal lines AEA, AEB. Upon receiving A/D conversion completion signals from both the A/D converters 121, 122, the timing pulse generating unit 128 converts a clock signal T1 (S) (refer to FIG. 3), which is delivered to the CCDs 103, 104 via a signal line T1, from "0" to "1", or from "1" to "0", shifts the CCDs 103, 104 by one bit, respectively, and redelivers the pulse signals for an A/D conversion start to the A/D converters 121, 122. In other words, an oscillation loop is formed by the timing pulse generating unit 128 and the A/D converters 121, 122, scanning by CCDs 103, 104 is executed by the operation of the oscillation loop, and these output signals are converted to digital signals by the A/D converters 121, 122 and inputted to the RAMs 123, 124.

In addition, the timing pulse generating unit 128 receives periodic data from a main control unit 1 via a data line TC. A counter which counts digital signals output through the signal line T1 as the clock signal T1 (S) (refer to FIG. 3) and creates one cycle on the basis of the periodic data is included in the timing pulse generating unit 128. This counter delivers one pulse of a timing pulse signal T2 (S) to the CCDs 103, 104 via a signal line T2 for each cycle. The CCDs 103, 104 are of cumulative effect type and are therefore capable of changing the magnitude of an output signal by controlling the cumulative time. The timing pulse signal T2 (S), which is output to the CCDs 103, 104 through the signal line T2, is used to control this cumulative time.

Furthermore, the timing pulse generating unit 128 receives a read start signal S (S) (refer to FIG. 3) from the main control unit 1 through a signal line S. When the timing pulse generating unit 128 receives the read start signal S (S) and outputs the timing pulse signals T2 (S) to the CCDs 103, 104, the timing pulse generating unit 128 outputs a write signal T3 (S) (refer to FIG. 3) synchronized with the clock signal T1 (S) to the counter 125 through a signal line T3, while the generation of the pulse signal T3 is stopped on receipt of a read completion signal E (S) (refer to FIG. 3), which will be described later, which is input from the counter 125 through a signal line E.

The counter 125 is reset as it receives the read start signal S (S) from the main control unit 1 through the signal line S, and subsequently counts the write signal T3 (S). The values counted by the counter 125 indicate the address values of the CCDs 103, 104 and are outputted to the RAMs 123, 124 through an address data line ADR. When the counted value reaches a predetermined number, e.g. the number of bits of the CCDs 103, 104, the counter 125 delivers the read completion signal E (S) to the timing pulse generating unit 128 and the main control unit 1 via the signal line E. Upon receipt of the write signal T3 (S), the RAMs 123, 124 write output data from the A/D converters 121, 122 at address positions according to the counted values of the counter 125.

The maximum value detecting units 126, 127 are each constituted by a comparator and a latch. The latch is reset by the read start signal S (S), and subsequently, if the data from the A/D converters 121, 122 is greater than the data in the latch, the content of the latch is replaced by the data outputted by the A/D converters by means of the write signal T3 (S). In other words, when a reading operation for one scanning cycle is completed, the maximum values (Amax), (Bmax) of the read data are held. These maximum 25 values (A max), (Bmax) are outputted to the main control unit 1 through a data line DAT upon receipt of a control signal delivered from the main control unit 1 through signal lines ME1, ME2.

When measurement starts, the main control unit 1, which is constituted by a microcomputer or a personal computer, first sends periodic data to the timing pulse generating unit 128 through a data line TC and then similarly sends the read start signal S (S) to the timing pulse generating unit 128 through the signal line S. As described above, the timing pulse generating unit 128 controls the cumulative time of the CCDs 103, 104, as described earlier, output signals for one scanning cycle from the CCDs 103, 104 are written in the RAMs 123, 124, and the maximum values (Amax), (Bmax) for one scanning cycle are detected by the maximum value detecting units 126, 127.

Upon receipt of the read completion signal E (S) from the counter 125, as described above, the main control unit 1 outputs control signals to the maximum value detecting units 126, 127 through signal lines ME1, ME2 so as to input the aforementioned maximum values (Amax), (Bmax) to the main control unit 1 through the data line DAT.

If the greater of the data (Amax), (Bmax) is not included in a predetermined range, i.e., if the outputs of CCDs 103, 104 are both too low, the read start signal S (S) is outputted to the timing pulse generating unit 128 by readjusting the periodic data, and the read data is retaken. However, if the greater of the data (Amax), (Bmax) is included in the predetermined range, the main control unit 1 transfers a pair of image data (A), (B) obtained in one scanning cycle which are stored in the RAMs 123, 124 to the main control unit 1 through the data line DAT, by controlling the RAMS 123, 124 through the address data line ADR and read signal lines RR1, RR2, and then inputs the same to the disk 2. Subsequently, the main control unit 1 drives the pulse motor 107 through a signal line MT to move the detecting units 101, 102 in the y-axis direction, and scanning in the x-axis direction is carried out again. Thus, image data (A), (B) concerning the object 3 with respect to the X- and Y-axes are stored in the disk 2.

Processing Output System

Figure 2:
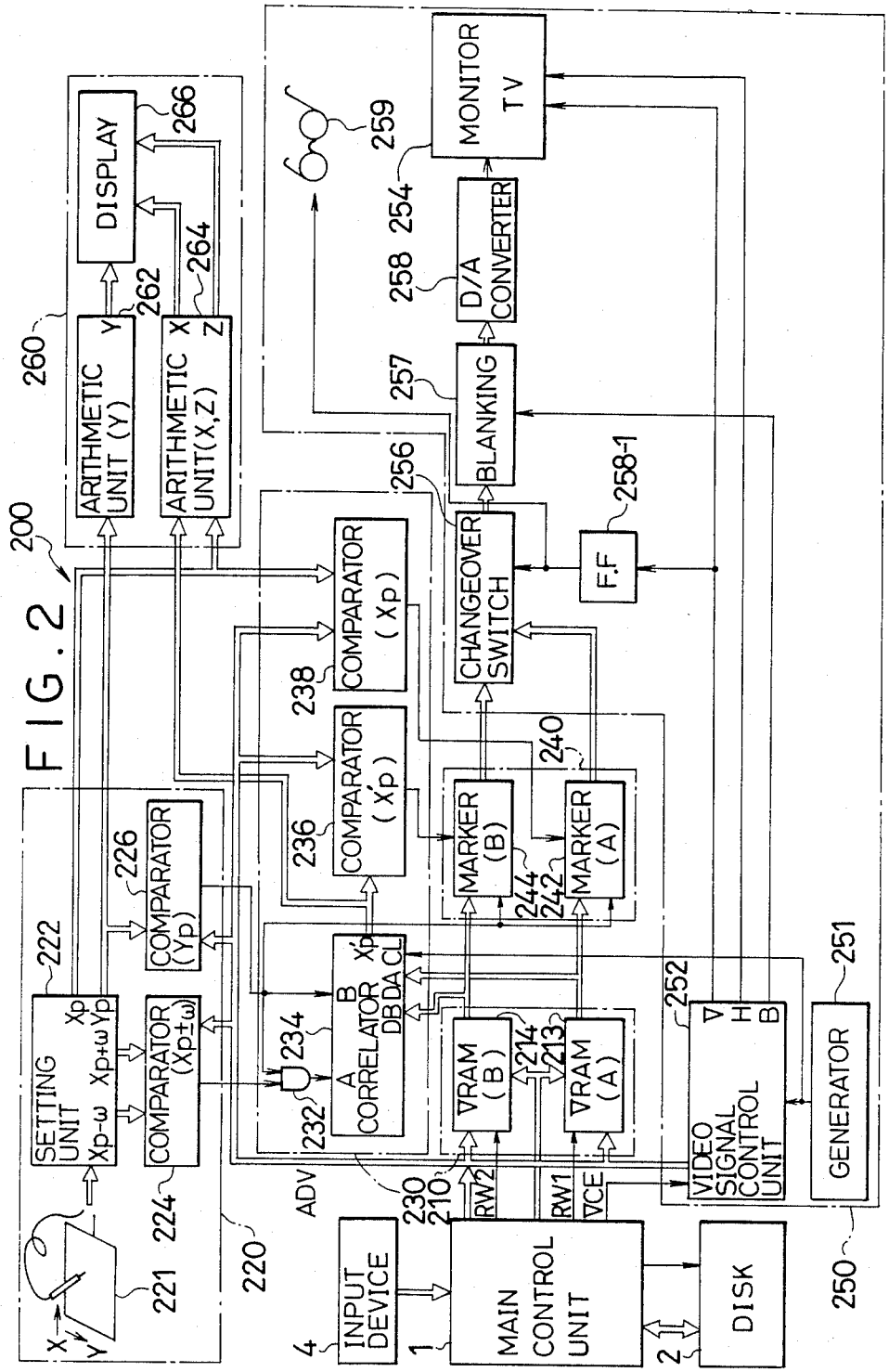
FIG. 2 is similarly a block diagram of a processing output system.

As shown in FIG. 2, the processing output system 200 alternately displays the images of the object 3 on a monitor TV 254 from the pair of image data (A), (B) stored in the disk 2, allows the measurer to obtain stereoscopy of the image of the object by viewing through separation eyeglasses 259 having a shutter for closing its right and left lenses alternately, and calculates and displays the coordinates on the X-, Y-, and Z-axes at a desired measurement point on the object 3.

As shown in FIG. 2, the processing output system 200 comprises a storage unit 210 for storing the image data (A), (B) forming stereo images; a measurement point setting unit 220 for setting a measurement point in the image data (A); a correlating unit 230 for finding a corresponding point in the image data (B) with respect to that measurement point by means of correlation processing; a marker unit 240 for adding measurement point mark data to the image data (A) on the basis of the measurement point set in the setting unit 220 and for adding corresponding point mark data to the image data (B) on the basis of the corresponding mark data supplied from the correlating unit 230 and outputting the same; an image forming unit 250 for forming images by means of the image data (A) including the aforementioned measurement point mark data output from the marker unit 240 and the image data (B) including the aforementioned corresponding mark data; and a display unit 260 for displaying a measurement point on the basis of the measurement point mark data and the corresponding point mark data. The processing output system having the above-described arrangement is controlled by the main control unit 1 which is connected to an input device 4 so as to effect desired control.

The video signal controlling unit 252 of the image forming unit 250 outputs a horizontal synchronization signal H and a vertical synchronization signal V, and a blanking signal B to the monitor TV 254, and a blanking signal B to the blanking unit 257 using as a clock signal the output signal of the generator 251 constituted by a counter or the like, and also outputs the address data to the VRAMs 213 an 214 through an address data line ADV for displaying the image data stored in the image memories VRAM (A) 213, (B) 214 at predetermined positions on the monitor TV 254. When an inhibiting signal from the main control unit 1 is inputted through a signal line VCE to the video signal control unit 252, it stops outputting the address data to the VRAMs (A) 213, (B) 214, but, at all other times, repeatedly outputs the address data to the VRAMs (A) 213, (B) 214. The main control unit 1 inputs image data pertaining to a desired region amongst the image data stored in the disk 2 to the VRAMs (A) 213, (B) 214 by means of the input device 4.

The output data of the VRAMs (A) 213, (B) 214 are input to the changeover switch 256 of the image forming unit 250 via the markers (A) 242, (B) 244 of the marker unit 240. A signal having a frequency which is one half the frequency of the vertical synchronization signal V of the video signal control unit 252 obtained by dividing the frequency of the vertical synchronization signal by two with a flip-flop 258-1, is inputted to the changeover switch 256, on the basis of which the changeover switch 256 alternately changes over the outputs from the marker (A) 242, (B) 244 to the blanking unit 257. Consequently, the monitor TV 254 alternately displays the images of the object based on the image data (A), (B) by means of the changeover operation of the changeover switch 256.

The blanking unit 257 stops the output of image data by means of the blanking signal B output from the video signal control unit 252 at the time of the fly-back of the monitor TV 254, and at other times delivers the output of the changeover switch 256 to a D/A converter 258. The D/A converter 258 converts a digital image data signal from the blanking unit 257 to an analog signal and outputs the same to the monitor TV 254.

The separation eyeglasses 259, which is used by the measurer when viewing the monitor TV 254, is arranged such that an optical shutter made by a liquid crystal or the like is provided to the right and left eyeglass lens frames, the optical shutter is made to synchronize with the pictures that are changed over on the monitor TV 254 by means of the output of a flip-flop 258-1 so as to open and close the right and left lenses alternately, thereby allowing a stereoscopic view of the object by viewing the images of the object based on the image data (A), (B) by the measurer's right and left eyes, respectively.

Measurement point setting unit 220 is designed to input coordinate values $x_p$, $y_p$ to set a measurement point on the monitor TV 254, and the output of a tablet or key 221 for inputting the coordinates of the measurement point is delivered to the setting unit 222. The setting unit 222 stores the input coordinate values $x_p$, $y_p$ of the measurement point and outputs the same to a comparator to be described later. At the same time, the setting unit 222 adds to the coordinate value $x_p$ a window constant $\pm\omega$, which has already been input concerning the coordinate value $x_p$, and thereby outputs $(x_p+\omega)$, $(x_p-\omega)$ to a comparator 224, designated $(x_p\pm\omega)$.

Since the correlating unit is adapted to extract a data train similar to a data train in the vicinity of a measurement point in the image data (A) from the image data (B), the window constant ($\pm\omega$) restricts the length of the data train at that time.

The comparator $(x_p\pm\omega)$ 224 receives address data from the video signal control unit 252 and window constant signals $(x_p+\omega)$, $(x_p-\omega)$ from the setting unit 222 and generates an output signal when the address data concerning the x-axis direction is between $(x_p+\omega)$ and $(x_p-\omega)$. A comparator 226 designated $(y_p)$ receives address data from the video signal control unit 252 and the coordinate value $y_p$ from the setting unit 222, and generates an output signal when the address data concerning the y-axis direction coincides with $y_p$.

The AND circuit 232 of the correlating unit 230 generates an output upon receipt of output signals from both the comparator $(x_p\pm\omega)$ 224 and the comparator $y_p$ 226. The correlator 234 receives the output signal of a generator 251 through a terminal CL as a clock signal, and, when the output signal of the AND circuit 232 is being input to a terminal A, output data from the VRAM (A) is inputted through a terminal DA. Meanwhile, when an output signal from the comparator $y_p$ 226 is being inputted to a terminal B, output data from the VRAM (B) 214 is inputted through a terminal DB. In other words, image data within the range of "$x_p\pm\omega$" at the line of the coordinate value $y_p$ stored in the VRAM (A) 213 as correlation data, as well as image data for one scanning cycle of the line of the coordinate value $y_p$ stored in the VRAM (B) 214 are inputted to the correlator 234. The correlator 234 detects a portion of image data similar to the image data of $(x_p\pm\omega)$ input from the terminal DA among the image data of one scanning cycle input from the terminal DB, and outputs a positional signal relating to the position of this portion, i.e, the coordinate value $x_p'$ of a point corresponding to an coordinate value $x_o$. The detailed arrangement of the correlator 234 will be described later.

The comparator $x_p$ 238 of the correlating unit 230 receives the signal of data $x_p$ input from the setting unit 222 and an address data signal in the x-axis direction from the video signal control unit 252, and, when the two coincide, the comparator $x_p$ 238 outputs the same to the marker (A) 242 of the marker unit 240. When an output signal is input from both the comparators $y_p$ and $x_p$, the marker (A) 242 outputs the output data from the VRAM (A) 213 by replacing it with a mark data, or by replacing the mark data with "FF" when the maximum value is a hexadecimal numeral and smaller than "FF", for instance. In other words, the image data (A) from the VRAM (A) 213 is output from the marker (A) 242 in the form of the image data containing a mark data which indicates a measurement point.

The comparator $(x_p')$ 236 receives the signal of the coordinate value $x_p'$ of a corresponding point corresponding to the coordinate value $x_p$ output from the correlator 234 as well as an address data signal in the x-axis direction from the video signal control unit 252, and, when the two coincide, the comparator $(x_p')$ delivers the same to the marker (B) 244. The marker (B) 244 is connected to the comparator $(y_p)$ 226 and the comparator $(x_p')$ 236, and, when outputs from the two comparators 226, 236 are input, the marker (B) 244 delivers an outputted from the VRAM (B) by replacing it with mark data. In other words, the image data (B) from the VRAM (B) is outputted from the marker (B) 244 in the form of the image data (B) containing mark data which indicates a corresponding point.

The image data (A), (B), containing mark data outputted the markers (A) 243, (B) 244 are inputted to the monitor TV 254 via the changeover switch 256, the blanking unit 257, and the D/A converter 258, are displayed on the monitor TV 254 as an image of the object, and the image of the object is viewed stereoscopically through the separation eyeglasses 259. At this juncture, if the results of the above-described correlation processing are not correct, the mark of a measurement point is viewed as floated or submerged relative to the surface of the image of the object, so that by observing the mark it is possible to discern whether or not the correlation processing has been correctly carried out.

The display 260 for calculating the coordinates (X, Y, Z) of a measurement point includes an arithmetic unit (Y) 262 and an arithmetic unit (X, Y) 264. The arithmetic unit (Y) 262 receives the signal representing the coordinate value $y_p$ from the setting unit 222, and calculates $Y=\alpha y_p+Y_o$, where, $\alpha$ denotes a moving pitch in the Y-axis direction by means of the pulse motor 107, while $Y_o$ denotes the position of the reference address (e.g. x=0,y=0) of the VRAM (A) 213 in the Y-axis direction with respect to an origin arbitrarily determined on a table for mounting the object 3.

Figures 3, 4:
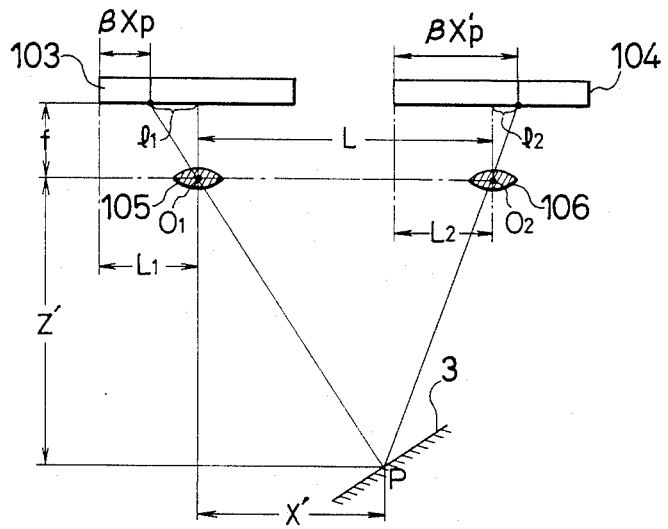
FIG. 3 is a waveform chart of the data reading system.
FIG. 4 is a diagram explaining the basic principle of calculation of coordinates.

The arithmetic unit (X, Z) 264 receives the signal representing the coordinate value $X_p$ from the setting unit 222 and the signal of the coordinate value $X_p'$ from the correlator 234 and performs the following operations to output the values of X and Z:

$$X = \frac{L_1 - \beta x_p}{\beta(x_{p'} - x_p) + L_1 - L_2} \cdot L + X_o \quad (1)$$

$$Z = -\frac{f}{\beta(x_{p'} - x_p) + L_1 - L_2} \cdot L + Z_o \quad (2)$$

where $\beta$ is an interval between the elements of the CCDs 103, 104; $L_1$, $L_2$ are distances from the left end of the CCDs 103, 104 to the centers $O_1$, $O_2$ of the lenses 105, 106, respectively, as shown in FIG. 4; L is a distance between the centers of the lenses $O_1$, $O_2$; f is a distance between the lenses 105, 106 and CCDs 103, 104; and $X_o$, $Z_o$ are an X coordinate value and a Y coordinate value, respectively, of a point $O_1$ with respect to the origin of an X, Y, Z coordinate system.

Formulas (1) and (2) are obtained from the relations (3) to (8) shown below.

$$X = X' + X_o \quad (3)$$
$$Z = -Z' + Z_o \quad (4)$$

$$X' = \frac{l_1}{l_1 + l_2} \cdot L \quad (5)$$

$$Z' = \frac{f}{l_1 + l_2} \cdot L \quad (6)$$

$$l_1 = L_1 - \beta x_p \quad (7)$$
$$l_2 = \beta x_p' - L_2 \quad (8)$$

The operation of the coordinates (X, Y, Z) may be performed by inputting the data $y_p$, $x_p$, and $x_p'$, into the microcomputer or personal computer constituting the main control unit 1.

Next, description of the aforementioned correlator 234 will be made. With respect to the basic principle of the correlator, there are the Sequential Similarity Detection Algorithm method (SSDA method) and the correlation coefficient method. The SSDA method is a method whereby in $$G_1 = \sum_{i=0}^{2\omega} |Ax_p - \omega + i - Bx_p' - \omega + i| \quad (9)$$

$x_p$, is changed consecutively, and $x_p'$, at the time when $G_1$ becomes minimum is found. Meanwhile, the correlation coefficient method is a method whereby in $$G_2 = \frac{\sum_{i=0}^{2\omega}(Ax_p - \omega + i - \overline{A_{x_p}})(Bx_p' - \omega + i - \overline{B_{x_p}'})}{\sqrt{\sum_{i=0}^{2\omega}(Ax_p - \omega + i - \overline{A_{x_p}})^2 \cdot \sum_{i=0}^{2\omega}(Bx_p' - \omega + i - \overline{B_{x_p}'})^2}} \quad (10)$$

$x_p'$, is changed consecutively, and $x_p'$ at the time when $G_2$ comes closest to "1" is found, where $Ax_p$, $Bx_p$ denote mean values.

Figure 5:
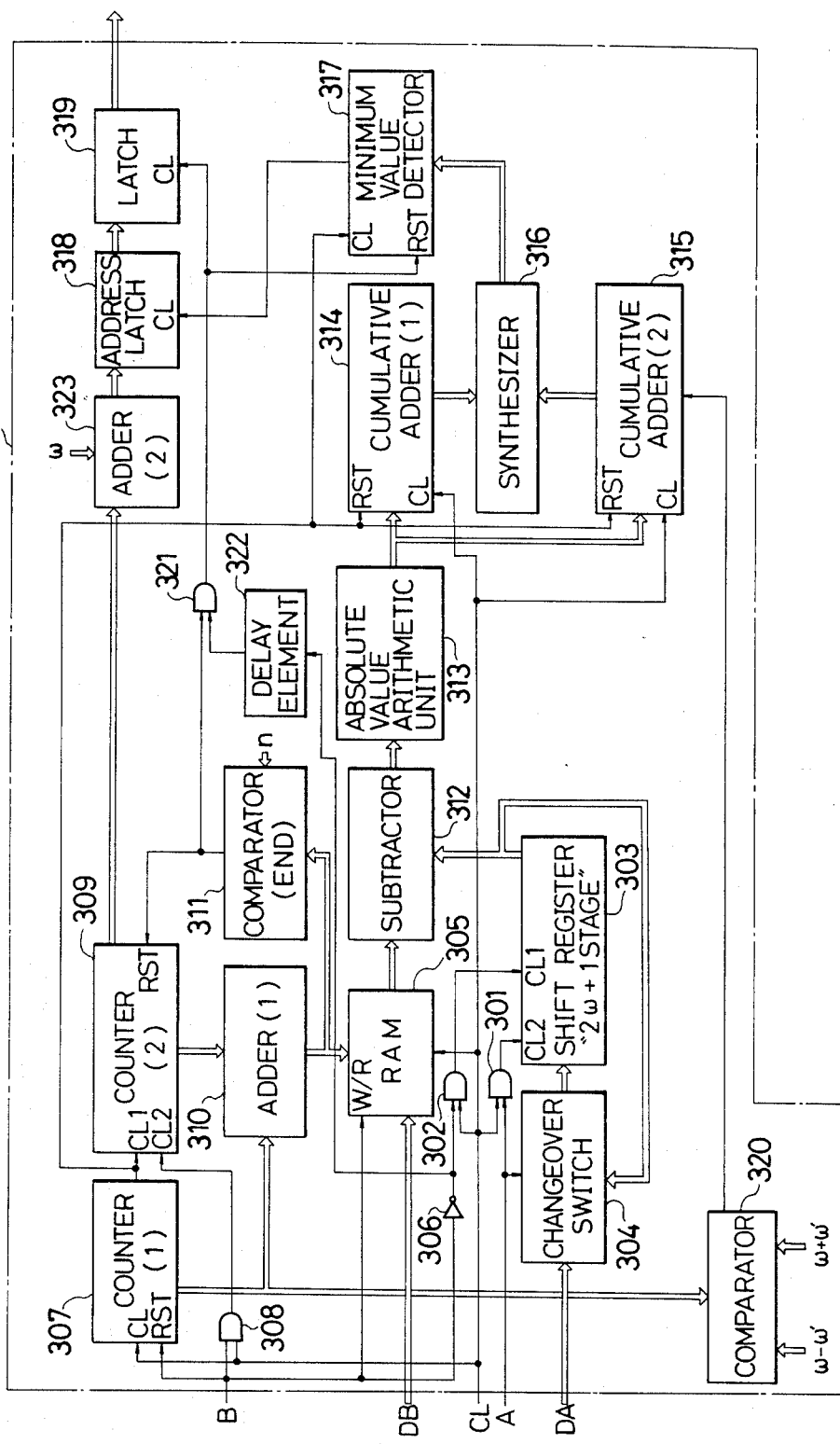
FIG. 5 is a block diagram of a correlator.

Referring now to FIG. 5, description will be made of the arrangement of the correlator 234 based on the aforementioned SSDA method. The terminal A where the output of the AND circuit 232 is delivered is connected to the AND circuit 301 and the changeover switch 304, while the terminal B where the output of the comparator ($Y_p$) 226 is applied is connected to the reset terminal RST of the counter (1) 307, the AND circuit 308, the RAM 305, and an inverter 306. The terminal DA where the output of the VRAM (A) 213 is applied is connected to the changeover switch 304, inputted while a terminal DB where the output of the vRAM (B) is inputted is connected to the RAM 305. A terminal CL where the output of the generator 251 is inputted is connected to the clock terminal CL of the counter (1) 307, the AND circuits 301, 302, the RAM 305, and the cumulative adders (1) 314, (2) 315.

The output terminal of the counter (1) 307 is connected to the counter (2) 309, the cumulative adders (1) 314, the minimum value detector 317, the cumulative adders (2) 315, the adder 310, and the comparator 320. The output terminal of the AND circuit 308 is connected to the counter (2) 309. The output terminal of the inverter 306 is connected to an AND circuit 302 and a delay element 322, while the outputs of the AND circuits 301, 302 are inputted to a shift register 303. The output of the changeover switch 304 input to the shift register 303, while the output of the shift register 303 is inputted to the changeover switch 304 and a subtractor 312.

The output of the counter (2) 309 is input to the adder (1) 310 and the adder (2) 323, while the output of the adder (1) 310 is input to the RAM 305 and a comparator (END) 311. The output of the comparator (END) 311 is input to the counter (2) 309 and the AND circuit 321, while the output of the delay element 322 is also input to the AND circuit 321.

The output of the RAM 305 is inputted to the cumulative adder (1) 314 and the cumulative adder (2) 315 via the subtractor 312 and an absolute value arithmetic unit 313. The outputs of the cumulative adders (1) 314, (2) 315 are input to a synthesizer 316, while the output of the synthesizer 316 is inputted to a minimum value detector 317. The output of the AND circuit 321 is inputted to the latch 319 and the minimum value detector 317. Furthermore, the output of the adder (2) 323 is inputted to the latch 319 via an address latch 318, while the output of the minimum value detector 317 is inputted to the address latch 318. The output of the latch 319 becomes an output of the correlator 234.

In the correlator 234 having the above-described arrangement, when a signal from the AND circuit 232 is inputted to the terminal A, a clock signal input from the terminal CL is inputted to the shift register 303 through the AND circuit 301, and output data from the VRAM (A) 213 appearing at terminal DA are consecutively inputted to the shift register 303 through the changeover switch 304. As for the shift registers 303, shift registers in a ($2\omega + 1$) stage corresponding to the number of data of ($x_p \pm \omega$) are disposed in parallel in a number equivalent to the number of bits constituting the data and shift the contents of the data in a parallel manner. However, when signals from the AND circuit 232 cease to be inputted to the terminal A, the changeover switch 304 supplies the output data of the shift register 303 to be used as the input of the shift register. Accordingly, a ring-shaped shift register, i.e., a ring register is formed by the changeover switch 304 and the shift register 303.

When a signal from the comparator (yp) 226 is inputted to the terminal B, the counter (1) 307 is reset, the RAM 305 assumes a writing state, and the counter (2) 309 assumes a calculating state by receiving a clock signal through the AND circuit 308. In other words, since the count of the counter (1) 307 is 0, the RAM 305 receives the contents of the counter (2) 309 as an address signal through the adder (1) 310, and writes the data from the terminal DB in an address position in accordance with the output of the counter (2) 309. The comparator (END) 311 compares the number 'n' of data for one scanning cycle which is an object for the detection of a corresponding point and the value from the adder (1) 310, and resets the counter (2) 309 when the two coincide.

When a signal from the comparator (yp) 226 is being inputted to the terminal B, the AND circuits 302, 321 assume an inhibited state by means of the inverter 306, and do not generate signals. Here, the delay element 322 prevents the AND circuit 321 from generating a signal owing to a time lag caused by the counter (2) 309, the adder (1) 310, and the comparator (END) 311.

As described earlier, while the address data concerning the y-axis from the video signal control unit 252 is $y_p$, signals are generated at the terminal B, and, while the address data concerning the x-axis during that period of generation is within the range of ($x_p \pm \omega$), signals are generated at the terminal A. Accordingly, among the image data (B) stored in the VRAM (B) 214, the image data in one scanning at the line $y_p$ is inputted, while, among the image data (A) stored in the VRAM (A) 213, the image data at the line $y_p$ falling within the range of "$x_p \pm \omega$" are consecutively inputted to the shift register 303.

The completion of generation of signals at the terminal B signals the start of correlation processing. In other words, when signals from the comparator ($y_p$) 226 cease to be applied to the terminal B, the counter (1) 307 begins counting clock signals, and the aforementioned ring register constituted by the changeover switch 304 and the shift register 303 operates in accordance with the clock signals as the inhibition of the AND circuit is released.

Also, the completion of generation of signals at the terminal B sets the RAM 305 in a read state, and makes the state of release of inhibition i.e., the state of output of the comparator (END) 311, transmittable to the latch 319 by slightly delaying the AND circuit 321.

The counter (1) 307 is a counter which counts one cycle when the count is $(2\omega+1)$, and operates in synchronization with the aforementioned ring register. The counted value of the counter (1) 307 means 'i' in Formula (9), and the correlator 234 calculates $G_1$ of Formula (9) every time the counter (1) 307 counts one cycle.

The counted value of the counter (2) 309 means $(x_p'-\omega)$, and increases by 1 every time the counter (1) 307 counts one cycle. The adder (1) 310 adds the counted values of the counters (1) 307, (2) 309, and inputs this counted value to the RAM 305 as address data. Accordingly during the initial cycle of the counter (1) 307, the RAM 305 outputs the output data of $B_0$, $B_1$, ... $B_{2\omega}$, during the following cycle outputs the output data of $B_1$, $B_2$, ..., $B_{2\omega 1}$, and during the next cycle outputs the output data of $B_2$, $B_3$, ..., $B_{2\omega+2}$. In other words, the output of the RAM 305 becomes a data train in which the value is increased by 1 data every time the counter (1) 307 counts one cycle.

The shift register 303 repeatedly outputs the data train of $A_0$, $A_1$, ..., $A_2$ every time the counter (2) 309 counts one cycle. This operation of the counter (1) 307 continues until the correlation processing is completed when the output value of the adder (1) 310 becomes 'n' and the comparator (END) 311 generates an output signal.

The subtractor 312 subtracts the output data of the RAM 305 from the output data of the shift register 303 and delivers the output. The absolute value arithmetic unit 313 converts to positive the output data of the subtractor 312 when that data is negative.

The cumulative adder (1) 314 is constituted by an adder and a latch, and consecutively adds the output data of the absolute value arithmetic unit 313 to the data held in the latch while the counter (1) 307 counts one cycle. Although the synthesizer 316 will be described later in detail, it should be understood here for the sake of explanation that the synthesizer 316 inputs the output of the cumulative adder (1) 314 to the minimum value detector 317.

The minimum value detector 317 is constituted by a comparator and a latch. The latch, when reset, assumes the largest value (e.g. "FF" in the case of 8-bits). When comparison of the input data with the content of the latch is made by the aforementioned comparator, and if the input data is smaller, the input data is inputted to the aforementioned latch, and an output signal meaning a change in the data held in the latch, is outputted from the minimum value detector 317 to the address latch 318. An output signal from the counter (1) 307 is supplied to the cumulative adder (1) 314 and the minimum value detector 317, and, every time the counter (1) 307 counts one cycle and its output signal is generated, the minimum value detector 317 operates. Upon completion of the generation of the output signal of the counter (1) 307, the cumulative adder (1) 314 is reset, and the output signal of the minimum value detector 317 stops.

Since a value in which $\omega$ is added to the counted value of the counter (2) 309 by the adder (2) 323, i.e., the value of $x_p'-\omega+\omega=x_p'$ since the counted value of the counter (2) 309 is $(x_p'-\omega)$, is supplied to the address latch 318, this $x_p'$ is stored in the latch 319 in conjunction with the generation of an output signal of the minimum value detector 317. Accordingly, the value $x_p'$ at the time when smaller $G_1$ is obtained is stored in the address latch 318. The output signal of the comparator (END) 311 is supplied to the latch 319 and the minimum value detector 317 through the AND circuit 321. As a result, the content of the address latch 318 is stored in the latch 319, and is outputted from the correlator 234 as output data. Meanwhile, the minimum value detector 317 assumes a reset state and provides for the next correlation processing.

The wider the window width ($2\omega$) in the correlation processing, the fewer the cases of disagreement of a corresponding point with respect to a measurement point, i.e., mismatching, but the change in the values of $G_1$ with respect to the change in $x_p'$ is gradual, with a resultant low detection sensitivity. On the other hand, the narrower the window width ($2\omega$), the higher the detection sensitivity, but the number of cases of mismatching increases since the data to be used in the calculation of correlation are fewer. To overcome this defect, the correlator 234 of the present embodiment is arranged such that, using two or more window widths, it is capable of detecting a final corresponding point by synthesizing the states of correlation obtained from each window width. The synthesizer 316, the cumulative adder (2) 315, and the comparator 320, which will be described hereinafter, operate for this purpose.

The comparator 320 generates an output signal when the output value of the counter (1) 307 is in the range of $(\omega\pm\omega')$. Since the output of the shift register 303 is $x_p$ when the counted value of the counter (1) 307 is $\omega$, $(\omega+\omega')$ means $(x_p'\pm\omega')$, where $\omega>\omega'$. The cumulative adder (2) 315 performs cumulative addition only when the comparator 320 is generating output signals. The synthesizer 316 synthesizes the values of the cumulative adders (1) 314, (2) 315 and delivers its output to the minimum value detector 317.

Figure 6:
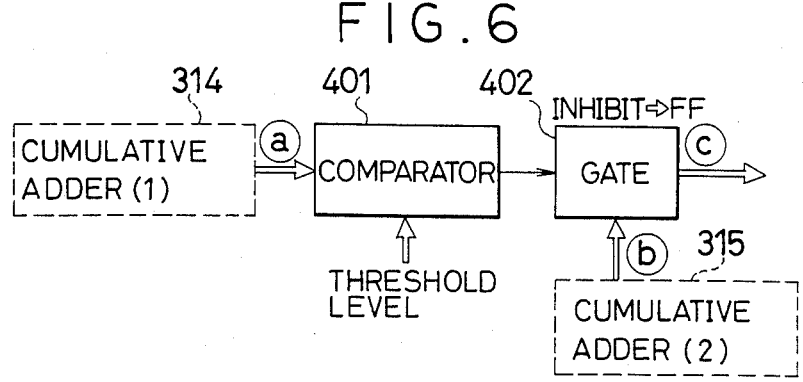
FIG. 6 is a block diagram of a synthesizer according to a first embodiment of the present invention.

Next, description will be made of the synthesizer 316. As shown in FIG. 6, the synthesizer in the first embodiment is constituted by a comparator 401 into which the output of the cumulative adder (1) 314 is inputted and a gate 402 into which the outputs of the comparator 401 and the cumulative adder (2) are inputted. As shown in FIG. 6, the comparator 401 compares an output ⓐ from the cumulative adder (1) 314 with a predetermined threshold level, and when the output ⓐ from the cumulative adder (1) 314 is smaller, the comparator 401 releases the gate 402 and delivers the output ⓑ of the cumulative adder (2) 315 to the minimum value detector 317, and, when the output ⓐ is larger than the aforementioned threshold level, inhibits the gate 402 and delivers to the same the largest value ("FF" in the case of 8-bits) as an output ⓒ.

Accordingly, in the synthesizer of the first embodiment, when a condition of correlation at a large window width is not good, it is assumed that there is no state of correlation by disregarding the state of correlation at a small window width. On the other hand, when a state of correlation is good at a large window width, a corresponding point is detected in a condition of correlation at a small window width which can be expected to be able to perform more accurate correlation processing.

Figure 7:
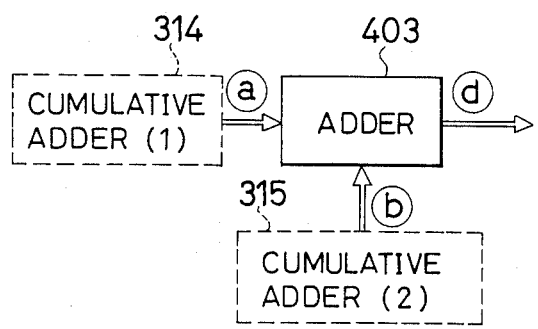
FIG. 7 is a block diagram of a synthesizer according to a second embodiment of the present invention.
Figure 8:
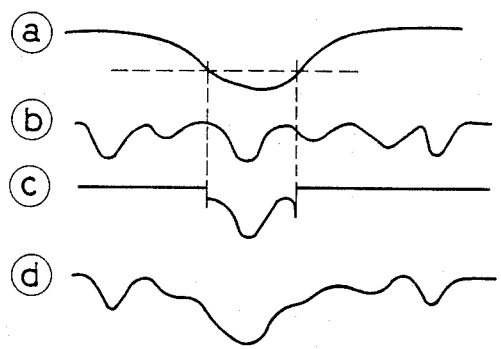
FIG. 8 is a waveform chart of the synthesizers of the first and second embodiments.

The synthesizer of a second embodiment is constituted by an adder 403, as shown in FIG. 7, and outputs to the minimum value detector 317 an output ⓓ in which the output ⓐ of the cumulative adder (1) 314 and the output ⓑ of the cumulative adder (2) 315 are added by the adder 403.

$$G = \frac{CA - \frac{WX}{2\omega} \cdot WY - \frac{WY}{2\omega} \cdot WX + 2\omega \frac{WX}{2\omega} \cdot \frac{WY}{2\omega}}{\sqrt{\left(CB - 2 \cdot \frac{WX}{2\omega} \cdot WX + 2\omega \frac{WX^2}{(2\omega)^2}\right) \cdot \left(CC - 2 \cdot \frac{WY}{2\omega} \cdot WY + 2\omega \frac{WY^2}{(2\omega)^2}\right)}} = \tag{11}$$

$$\frac{CA - \frac{1}{2\omega} \cdot WX \cdot WY}{\sqrt{\left(CB - \frac{1}{2\omega} WX^2\right) \cdot \left(CC - \frac{1}{2\omega} WY^2\right)}} = F(CA, CB, CC, WX, WY)$$

Where $$\begin{aligned}
CA &= \sum_{i=0}^{2\omega} A_{x_p - \omega + i} \cdot B_{x_{p'} - \omega + i} \\
CB &= \sum_{i=0}^{2\omega} A^2_{x_p - \omega + i} \\
CC &= \sum_{i=0}^{2\omega} B^2_{x_{p'} - \omega + i} \\
WX &= \sum_{i=0}^{2\omega} A_{x_p - \omega + i} \\
WY &= \sum_{i=0}^{2\omega} B_{x_{p'} - \omega + i}
\end{aligned} \tag{12}$$

This method, whereby a state of correlation at respective window widths is synthesized using the above-described two or more window widths so as to detect a final corresponding point, is applicable to a correlator employing the aforementioned correlation coefficient method. As for a synthesizing method in this case, it is appropriate to adopt a method whereby a state of correlation at a large window width is judged with respect to a predetermined threshold level, as in the case of the synthesizer of the first embodiment, and, when the state of correlation is good, a state of correlation at a small window width is employed, or a method in which states of correlation at a large window width and a small window width are multiplied.

In the above-described embodiments of the coordinates measuring apparatus, an arrangement is made such that the input of a measurement point is effected by means of a tablet or key, but it is also possible to make an alternative arrangement in which measurement points are predetermined and corresponding points are detected consecutively with respect to these measurement points. Furthermore, the input of a measurement point may be effected by projecting a latticed pattern onto the object 3 by means of the illumination unit 108, extracting the position of the latticed pattern from the image data (A), setting the extracted position of the latticed pattern as the x-coordinate value of the measurement point, and using a predetermined one as the y-coordinate value.

The above-described correlator 234 has a circuit shown in FIG. 5 to effect correlation processing on a real-time basis. If it is not necessary to effect correlation processing at a high speed, the correlation processing may be carried out by an arithmetic unit such as a microcomputer. As is apparent from Formula (10), the correlation coefficient method has numerous operating functions and is therefore advantageously processed by means of a program. Therefore, the correlation processing according to the correlation coefficient method using an arithmetic unit will be described with reference to a flowchart show in FIG. 9. As described before, the correlation coefficient method is expressed by Formula (10), and if this Formula (10) is developed, we have Hence, a coefficient of correlation G can be obtained by fixing factors CA, CB, CC, WX and WY and inserting them into Formula (11).

Figure 9B:
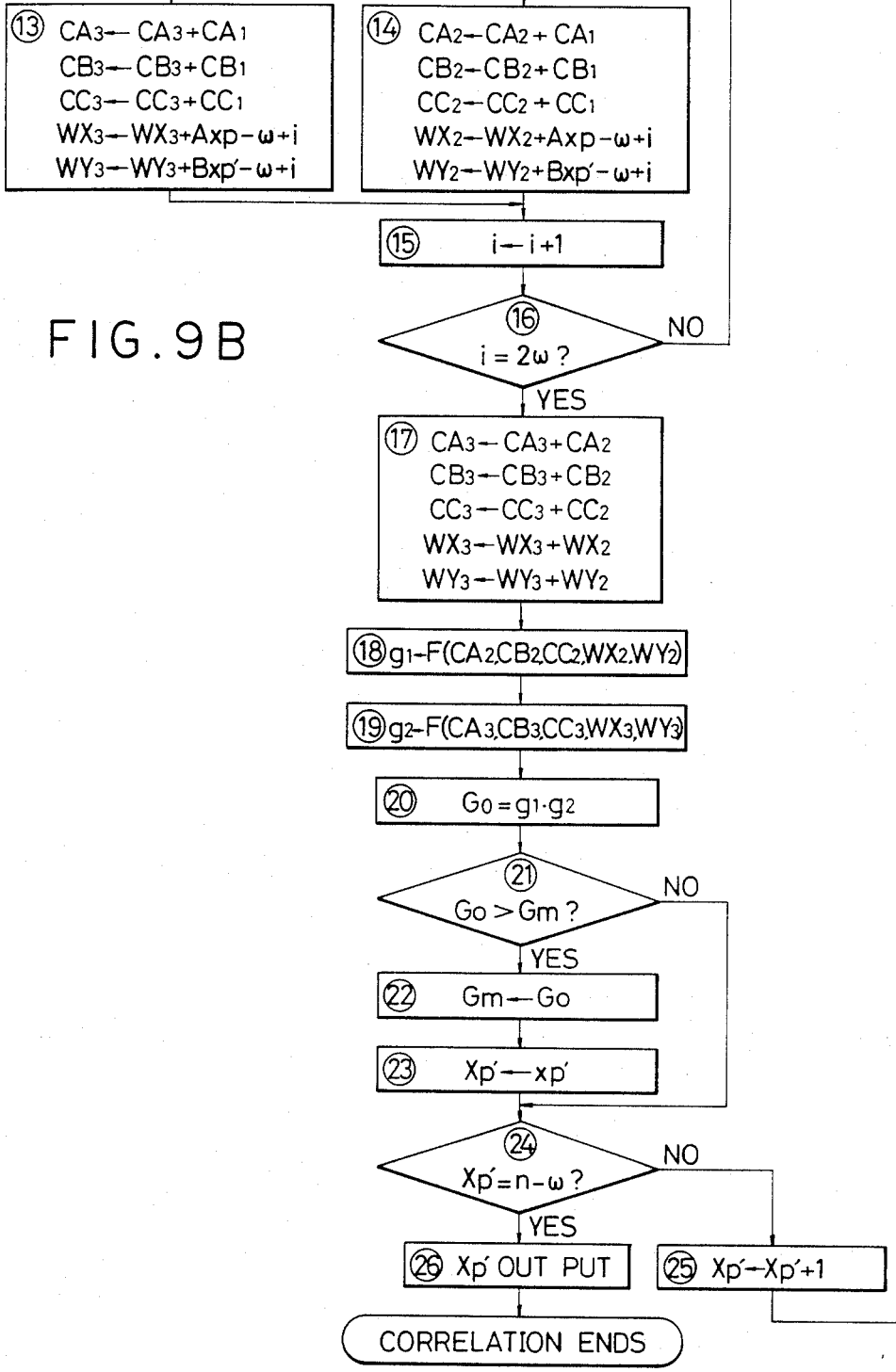

Referring now to FIG. 9, in Step ①, large and small window widths ω, ω' are read from the setting unit 222 and in Step ②, coordinate values xp, yp of the measurement point are read from the setting unit 222. In Step ③, image data from $(Ax_p - \omega)$ to $(Ax_p + \omega)$ and from $B_o$ to $B_n$ at a $y_p$ line set in the setting unit are read from the VRAMs (A) 213, (B) 214. In Step ④, 0 is input as the initial value used at the time when there is no correlation.

In Step ⑤, as the initial setting of $x_p'$, ω, which is one half of the window width, is input. In Step ⑥, inputted has the initial value of i. In Step ⑦, 0 is inputted to $CA_2$, $CA_3$, $CB_2$, $CB_3$, $CC_2$, $CC_3$, $WX_2$, $WX_3$, $WY_2$ and $WY_3$, respectively. In Steps ⑧, ⑨ and ⑩, $(Ax_p - \omega + i \cdot Bx_p - \omega + i)$ $(Ax_p - \omega + 1)^2$, and $(Bx_p - \omega + i)^2$ are calculated, and the results are written in $CA_1$, $CB_1$ and $CC_1$, respectively.

In Step ⑪, judgment is made as to whether $i < \omega - \omega'$, and if YES is the answer, the operation proceeds to Step ⑬, and if NO, to Step ⑫. In Step ⑫, judgment is made as to whether $i > (\omega + \omega')$, and if YES is the answer, the operation proceeds to Step ⑬, and if NO, to Step ⑭. In Step ⑬, $CA_1$ is added to $CA_3$, and $CB_1$ to $CB_3$, $CC_1$ to $CC_3$, $WX_1$ to $WX_3$, and $WY_1$ to $WY_3$, respectively, and hence $CA_3$, $CB_3$, $CC_3$, $WX_3$, $WY_3$ are rewritten, respectively. In Step ⑭, $CA_1$ is added to $CA_2$, $CB_1$ to $CB_2$, $CC_1$ to $CC_2$, $WX_1$ to $WX_2$, and $WY_1$ to $WY_2$, respectively, and hence $CA_2$, $CB_2$, $CC_2$, $WX_2$, and $WY_2$ are rewritten, respectively.

In Step ⑮, 1 is added to the value of i, and the processing data advances one stage as a result. In Step ⑯, judgment is made as to whether $i = 2\omega$, i.e., whether or not all data in the window have been processed. If YES, the operation proceeds ⑰, and if NO, returns to Step ⑧. In Step ⑰, CA₂ is added to CA₃, CB₂ to CB₃, CC₂ to CC₃, WX₂ to WX₃, and WY₂ to WY₃, respectively, each becoming a factor corresponding to a large window.

CA₂, CB₂, CC₂, WX₂, and WY₂ represent factors corresponding to small windows, and, by performing operations by inserting these values into Formula (11), a coefficient of correlation $g_1$ in a small window is found. In Step ⑲, by performing operations by inserting into Formula (11) the values of the factors CA₃, CB₃, CC₃, WX₃, and WY₃ obtained in Step ⑰, a coefficient of correlation $g_2$ in a large window is found.

In Step ⑳, which is a coefficient of correlation synthesized by the coefficient of correlation $g_1$ in the small window and the coefficient of correlation $g_2$ in the large window, is found from $g_1$ and $g_2$. In Step ㉑, decision is made as to whether or not $G_o > G_m$. If YES, the operation proceeds to Step ㉒, and if NO, to Step ㉔. In Step ㉒, the content of $G_m$ is substituted by $G_o$, and in Step ㉓, $x_p'$ is inputted for $x_p'$.

In Step ㉔, judgment is made as whether or not $x_p' = n - \omega$, i.e., whether or not retrieval has ended. If YES, the operation proceeds to Step ㉖, and if NO, to Step ㉕ in which '$X_p$' is increased by 1 and the operation is returned to ⑥. In Step㉖, $x_p'$, in which a maximum coefficient of correlation $G_o$ is obtained, i.e., a corresponding point, is outputted, thereby completing the correlation processing.

In the foregoing embodiments, the minimum value detector 317 of the correlator 234 accumulates the data indicating the state of correlation of corresponding points, but this state of correlation can also be indicated by displaying a mark indicating a measurement point, for example, by changing the color or the like. In addition, it is also possible to connect an adder to the output portion of the correlator 234, and to make a such an arrangement that, when it is decided that the correlation processing is not being carried out with a desired accuracy, the coordinates of a corresponding point can be corrected by the use of said adder.

The invention has thus been shown and described with reference to a specific embodiment. However, it should be noted that the invention is in no way limited to the details of the illustrated arrangement but charges and modifications may be made without departing from the scope of the appended claims.

We claim:

1. Apparatus for determining the coordinates of a measurement point on a three-dimensional object comprising, in combination:
   first and second photoelectric conversion means disposed at a selected height from the object and spaced apart a predetermined distance in the direction of an x-axis and moveable together incrementally in the direction of a y-axis for respectively generating first and second data signals respectively representing first and second images of said object each divided into a plurality of measurement points and together constituting a stereoscopic image;
   first and second memory means respectively connected to said first and second photoelectric conversion means for respectively storing said first and second data signals representing said first image and said second image, respectively;
   measurement point setting means for storing data signals representing x and y coordinates of measurement points in said first image;
   correlation processing means connected to said first and second memory means and to said measurement point setting means for processing output signals from said first and second memory means and data signals from said measurement point setting means representing a selected measurement point in said first image and producing a measurement point in the second image substantially corresponding to the selected measurement point in said first image;
   mark generating means connected to said first and second memory means for adding to the data signal representing said first image a mark data signal concerning said selected measurement point and for adding to the data signal representing said second image a corresponding mark data signal concerning the measurement point supplied from said correlation processing means;
   image display means including a display screen and video signal control circuit means for raster scanning said display screen at a predetermined vertical synchronization frequency;
   signal processing means including means for applying the data signal representing said first image and containing said mark data signal to said image display means alternately with the data signal representing said second image and containing said corresponding mark data signal each at one-half the vertical synchronization frequency for producing on said display screen an image of said object including images of said mark data signal and said corresponding data signal, and means through which the display screen image of said object is viewed alternately with the left and right eye each at one-half said vertical synchronization frequency for presenting a three-dimensional image of said object and enabling visual examination to determine whether the image of the measurement point in said second image is correctly positioned in the viewed image; and
   calculating means connected to said correlation processing means and to said measurement point setting means for calculating values of the x, y, and height (z) coordinates of said selected measurement point when the image of the measurement point in said second image is determined to be correctly positioned in the viewed image.

2. Apparatus for determining the coordinates of a measurement point on a three-dimensional object according to claim 1, wherein said measurement point setting means includes means for applying to said correlation processing means a first signal representing the value of the x-coordinate of the selected measurement point plus a constant value for establishing a window centered on the selected measurement point for determining the length of a data train selected for correlation processing in the determination of the location of said corresponding measurement point in said second image, and a second signal representing the value of the y-coordinate of said selected measurement point.

3. Apparatus for determining the coordinates of a measurement point on a three-dimensional object according to claim 2, wherein said measurement point setting means includes means for selectively adding one of at least first and second different constants to said value of the x-coordinate for establishing one of two or more different window widths.

4. Apparatus for determining the coordinates of a measurement point on a three-dimensional object according to claim 1, wherein said correlation processing means includes circuit means constructed and arranged for performing correlation processing by the Sequential Similarity Detection Algorithm (SSDA) method.

5. Apparatus for determining the coordinates of a measurement point on a three-dimensional object according to claim 1, wherein said correlation processing means includes circuit means arranged for performing correlation processing by the correlation coefficient method.

6. Apparatus for determining the coordinates of a measurement point on a three-dimensional object according to claim 1, wherein said apparatus further comprises illumination means interposed between said first and second photo-electric conversion means for projecting a pattern onto said object.

7. Method for determining the coordinates of a measurement point on a three-dimensional object comprising the steps of:

(a) generating and storing first and second data signals respectively representing first and second images of an object each having a plurality of measurement points and together constituting a stereoscopic image;

(b) adding to the data signal representing said first image signal data signals representing x and y coordinates of a selected measurement point on said object;

(c) by correlation processing finding in said second data signal a measurement point in said second image which substantially corresponds to the selected measurement point in said first image;

(d) adding to the data signal representing said first image a mark data signal representing the location of the selected measurement point and adding a mark data signal to the data signal representing said second image at the location in said second image which corresponds to the selected measurement point in sai first image;

(e) forming from the data signals resulting from step (d) a stereoscopic image of said object;

(f) visually examining said stereoscopic image and determining whether the image of the measurement point in said second image is correctly positioned in the image;

(g) repeating steps (b) through (f) until the image of the measurement point in the second image is correctly positioned in the image; and (h) then calculating the values of x, y and height (z) coordinates of the selected measurement point from data signals representing said selected measurement point and the measurement point in said second image.

* * * * *